1/25/83 OR 4,370,020

United States Patent [19]

Davey

[11] 4,370,020

[45] Jan. 25, 1983

[54] TRANSPORTABLE FIBRE OPTIC APPARATUS FOR USE IN A SECURITY SYSTEM

[76] Inventor: James W. Davey, 40 Grenville Ave., Savoy Estates, Johannesburg, Transvaal, South Africa

[21] Appl. No.: 162,837

[22] Filed: Jun. 25, 1980

[30] Foreign Application Priority Data

Jul. 10, 1979 [ZA] South Africa ........................ 79/3456

[51] Int. Cl.³ .......................... G02B 5/14; G08B 13/18

[52] U.S. Cl. .................................. 350/96.10; 250/227; 340/555

[58] Field of Search ............... 350/96.10, 96.15, 96.20; 340/555, 556, 557; 116/67 A, 77; 250/227

[56] References Cited

U.S. PATENT DOCUMENTS 3,943,021 3/1976 Lindsey ........................ 350/96.10 X
4,095,872 6/1978 Stieff et al. .................... 350/96.20 X
4,275,294 6/1981 Davidson ........................ 340/555 X
4,307,386 12/1981 Bridge ................................ 340/555

FOREIGN PATENT DOCUMENTS 1488409 10/1977 United Kingdom ............. 350/96.20
1497995 1/1978 United Kingdom ............. 350/96.10

*Primary Examiner*—John D. Lee
*Attorney, Agent, or Firm*—Oblon, Fisher, Spivak, McClelland & Maier

[57] ABSTRACT

Apparatus which comprises at least one length of flexible optic fibre, storage means for receiving the length of optic fibre, means for transmitting an optical signal along the length of optic fibre, and means for detecting an optical signal in the length of optic fibre. There is also provided a communication or security system which comprises at least one loop of flexible optic fibre, a reel on which the optic fibre is coilable, means for transmitting an optical signal along the loop of optic fibre, and means for detecting an optical signal in the length of optic fibre.

5 Claims, 4 Drawing Figures

TRANSPORTABLE FIBRE OPTIC APPARATUS FOR USE IN A SECURITY SYSTEM

BACKGROUND OF THE INVENTION

This invention relates to fibre optic apparatus which is primarily, although not exclusively, suited for use in security and communication applications.

The specification of South African Pat. No. 78/5419 describes a security system in which a length of optic fibre is permanently located at the boundary of a given area. Undue movement or breakage of the optic fibre, which may be caused for example by an intruder, produces variations, which includes complete cessation, in the intensity of an optical signal in the optic fibre which may be detected to signify a security breach. Similar installations are disclosed in the specifications of German Pat. No. 2714241 and U.K. Pat. No. 1,497,995. Security systems of this type suffer from the disadvantage that they are by nature permanent installations.

SUMMARY OF THE INVENTION

It is an object of the present invention to provide apparatus which avoids this drawback.

The invention provides apparatus which comprises at least one length of flexible optic fibre, storage means for receiving the length of optic fibre, means for transmitting an optical signal along the length of optic fibre, and means for detecting an optical signal in the length of optic fibre. Further according to the invention, the apparatus is a transportable unit.

The storage means may comprise any suitable mechanism but preferably includes a reel, e.g. a spool or the like, on which the length of optic fibre is coiled. The reel may be rotatable relatively to a suitable support to facilitate the paying out off the reel of the length of fibre and the coiling thereof onto the reel.

The transmitting means may be attached to the storage means, for example it may be located in or on the reel.

One of the transmitting means or the detecting means may be optically connected to the length of optic fibre. This connection may be at one end of the length of the optic fibre. The other end may be detachably optically connectable to the other of the transmitting or detecting means.

The apparatus may include, for its operation, a power source e.g., battery means. The battery means may be housed in the reel.

The detecting means may be responsive to variations, which would include complete cessation, in the intensity of the optical signal in the length of optic fibre, and, when the intensity varies by a predetermined amount, actuate a switching mechanism.

The transmitting means may be modulated so as to transmit information along the length of optic fibre. The detecting means may then include demodulating means. Alternatively use may be made of suitable receivers, which may be inductively coupled to the length of optic fibre.

BRIEF DESCRIPTION OF THE DRAWINGS

The invention is further described by way of examples with reference to the accompanying drawings in which:

FIGS. 3 and 4 illustrate different modes of use of the apparatus.

DESCRIPTION OF A PREFERRED EMBODIMENT

Figure 1:
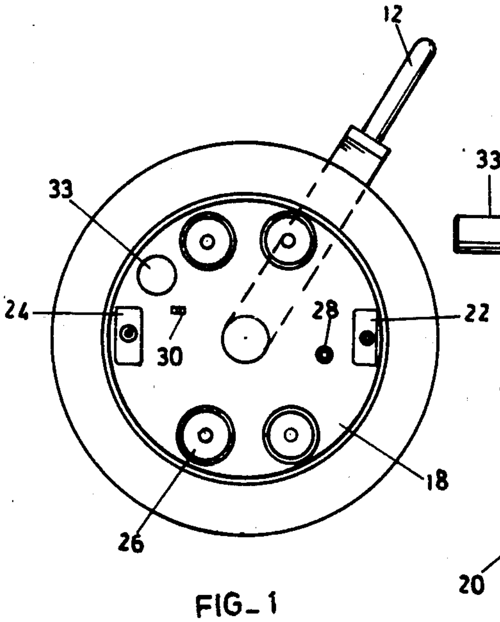
FIG. 1 is a side view of fibre optic apparatus according to the invention.
Figure 2:
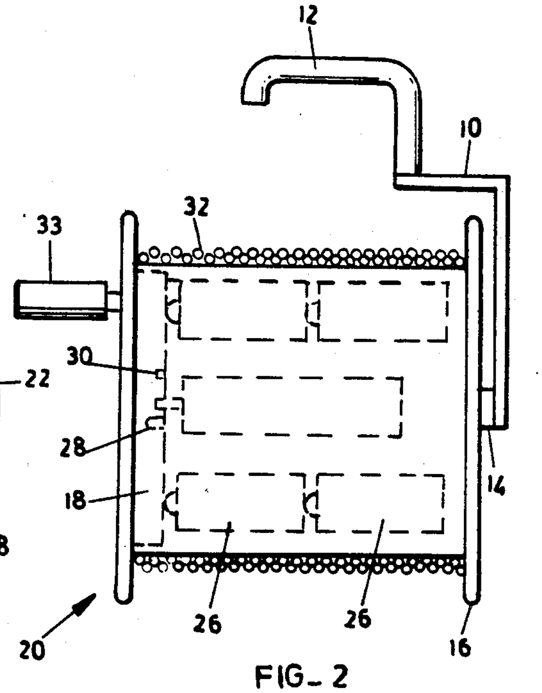
FIG. 2 is an end view of the apparatus of FIG. 1.

FIGS. 1 and 2 illustrate apparatus according to the invention which consists of a holder 10 with a handle 12, an axle 14 secured to the holder, and a reel 16 rotatably mounted on the axle 14.

The reel 16 is formed with a recess 18 in one of its faces 20. Located in the interior of the reel 16, and installed from the face 20, are an optical transmitter 22, an optical receiver 24, a number of batteries 26, an alarm 28 which may be visual or audible, and a switch 30.

A length 32 of flexible optic fibre is wound on the reel 16 by rotating winding handle 33 about the axis of the reel.

One end of the length of optic fibre is optically connected to the optical receiver 24. The receiver 24, the transmitter 22 and the alarm 28 are powered by means of the batteries 26 with the electrical connection between these devices being controlled by means of the switch 30. The receiver 24 is of the kind which is set to respond to light intensity about an adjustable reference level.

In use of the apparatus the free end of the optic fibre 32 is located at a given position and the optic fibre is unwound from the reel simply by coiling the optic fibre off the reel by moving the apparatus away from the position at which the free end of the optic fibre is located, with the apparatus raised so that the reel 16 is free to rotate. The length of optic fibre is laid as required along a path which forms a closed loop and which surrounds an installation which is to be protected. Thus the reel 16 is eventually returned to the position at which the free end of the optic fibre is located. The free end is then optically connected to the optical transmitter 22.

The security system is actuated by operating the switch 30 so that an optical signal is supplied by the transmitter 22 to the optic fibre 32. This signal is detected by the receiver 24 which is then set so that it responds to variations of a predetermined magnitude in the intensity of the optical signal, from the initial intensity values.

Figure 4:
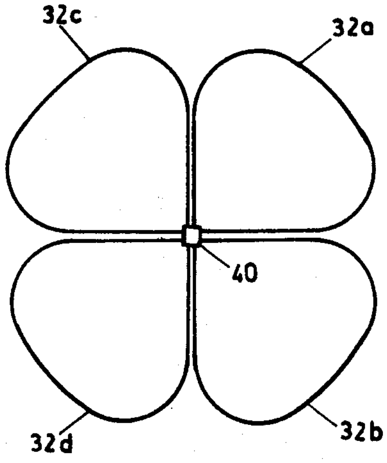
Figure 5:
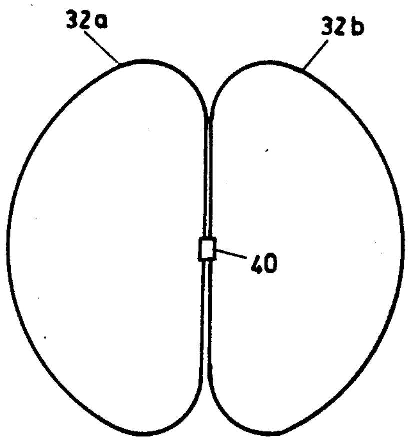

Should the length of the optic fibre be disturbed, for example by being bent or broken by an intruder, the intensity of the light signal is varied and this variation is detected by the receiver 24 and used to actuate the FIGS. 3 and 4 illustrate different ways in which multiples of the apparatus may be deployed to lay the optic fibre 32 around a central point 40. In FIG. 3 use is made of two separate lengths of optic fibre $32^a$ and $32^b$ while in FIG. 4 use is made of four lengths of optic fibre $32^a$, $32^b$, $32^c$ and $32^d$ respectively. The use of multiples of the apparatus permits the position of a disturbance to be more accurately determined, by reference to one of two particular multiples only.

The advantage of the apparatus of the invention lies in its mobility for the apparatus may be transported to any suitable location and may then be rapidly deployed. After use the optic fibre 32 is simply rewound by the winding handle 33, onto the reel 16 and the apparatus is then ready for transport.

Although the apparatus has been described with reference to security applications of a defensive nature it may also be used for initiating offensive actions. For example when the alarm 28 is triggered an explosive charge may be detonated or other attacking action may be initiated.

A further application of the apparatus in a modified form would be for communication purposes, in which case two inter-connected apparatuses, each including an optical transmitter and receiver could be located at points remote from one another. Naturally for the transmission of information the transmitter 22 would incorporate a suitable modulating device and each receiver would require a demodulating device.

I claim:

1. A transportable unit for use in a security system, the unit comprising an axle and a handle for supporting the axle, a reel, rotatably mounted on the axle, on which a length of optic fibre is coiled and from which the optic fibre can be drawn as required, a transmitter for transmitting an optical signal along the length of optic fibre, and detecting means connectable to the optic fibre to detect said optical signal.

2. A unit according to claim 1 which incorporates an independent power source.

3. A unit according to claim 1 wherein the detecting means is responsive to variations, including cessation, in the intensity of the optical signal in the length of optic fibre.

4. A unit according to claim 1 wherein the transmitter includes means for modulating the transmitting optical signal.

5. A security system comprising a unit according to claim 1 in which the optic fibre is drawn at least partially from the unit to form a loop around the perimeter of an area and the end of the optic fibre is brought back to and connected to the unit, and interruption of signals passing along the optic fibre is detected by the detecting means to indicate an intrusion into the area.

* * * * *